March 9, 1954  R. L. HART  2,671,429
CHICKEN FEEDER
Filed July 16, 1951

INVENTOR.
RICHARD L. HART
BY Arthur H. Sturges
Attorney.

Patented Mar. 9, 1954

2,671,429

UNITED STATES PATENT OFFICE 2,671,429

CHICKEN FEEDER

Richard L. Hart, McCook, Nebr.

Application July 16, 1951, Serial No. 236,895

1 Claim. (Cl. 119—61)

This invention relates to poultry feeding devices of the adjustable type wherein the same feeder is adapted for feeding baby chicks, and partly and full grown chickens, and in particular this invention includes a vertically and laterally adjustable feed trough wherein the sides are drawn together to provide troughs for young chickens and the entire trough is adjustable upwardly to form a feed hopper for grown chickens.

The purpose of this invention is to provide a poultry feeder that is not only adjustable for feeding fowl of all sizes, but that also requires the fowl to stretch to reach the food whereby the leg muscles are exercised and, consequently strengthened.

Where chickens are raised in enclosed chicken houses and are not turned out on the ground, they do not have an opportunity to scratch and the leg and other muscles do not properly develop. Furthermore in the conventional type of poultry feeder it is difficult to adjust the parts both vertically and laterally which is necessary if the feeder is to be used for chickens of all ages.

With these thoughts in mind this invention contemplates a poultry feeder having a base with flanges at the sides and plates on the ends, end supports, channel shape in cross section, in which the ends of the base are nested, laterally adjustable side walls with recesses in the lower edges and having flanges on the ends mounted in the base, and a spinner journaled in the upper parts of the plates on the ends of the base.

The object of this invention is, therefore, to provide means for constructing a poultry feeder whereby the parts are adjustable laterally to provide feed troughs for small chickens, and vertically to require chickens to stretch to reach the feed whereby the leg muscles of chickens feeding from the trough are strengthened.

Another object of the invention is to provide a poultry feeder that is both laterally and vertically adjustable in which means is provided for preventing fowl roosting on the feeder so that droppings from the fowl do not drop into the feed.

Another object of the invention is to provide a feeder for poultry that may be adjusted both laterally and vertically by the average layman, so that the services of a mechanic are not required to change the size of the feeder.

A further object of the invention is to provide a laterally and vertically adjustable feeder for poultry that is portable so that it may readily be moved from place to place.

A still further object of the invention is to provide an improved poultry feeder that is adjustable both laterally and vertically so that it is adapted for feeding poultry of all ages which is of a simple and economical construction.

With these and other objects and advantages in view the invention embodies a poultry feeder having end supports with vertically disposed slots therein, a base having flanges on the sides and vertically positioned plates on the ends nested in the end supports, a spinner or rocker journaled in the upper parts of the vertically positioned plates of the base, side walls with horizontally extended flanges on the ends positioned in the base and having horizontally disposed slots in the flanges thereof, and studs with thumb nuts thereon extended through the slots of the flanges of the side walls, the slots of the end supports, and also through the plates on the ends of the base.

Other features and advantages of the invention will appear from the following description taken in connection with the drawing, wherein.

Figure 1:
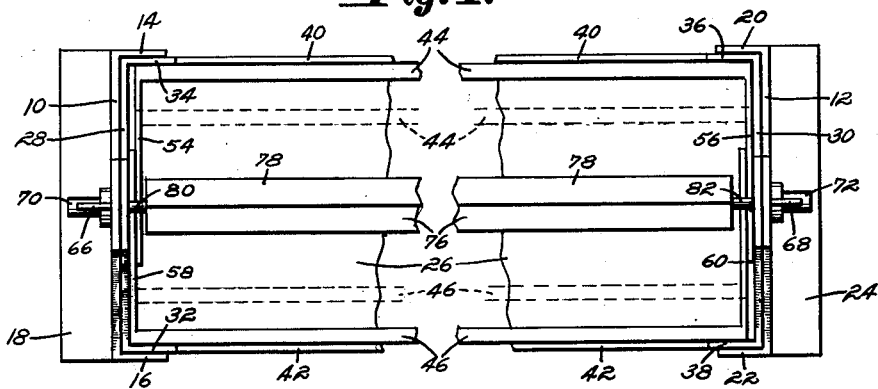
Figure 1 is a plan view of the improved adjustable feeder showing the parts assembled and with parts broken away, and showing the side walls in inwardly adjusted positions in dotted lines.
Figure 2:
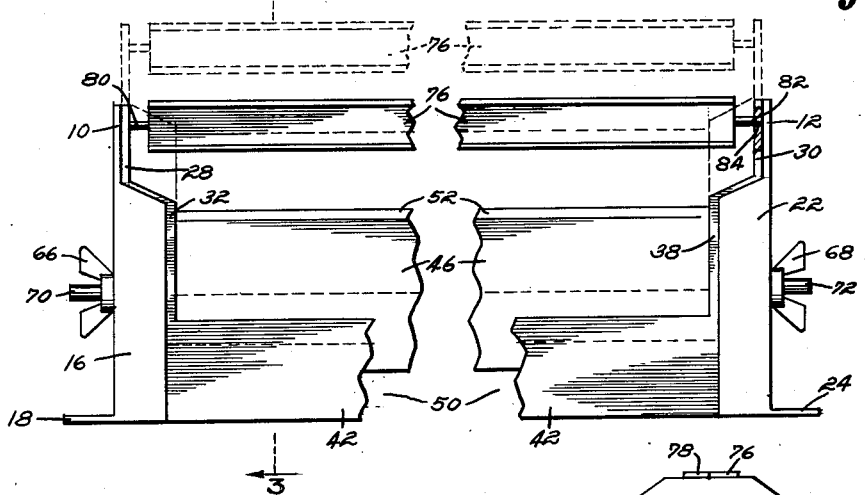
Figure 2 is a side elevational view also with parts broken away and showing the parts in upwardly adjusted positions in dotted lines.
Figures 3, 4:
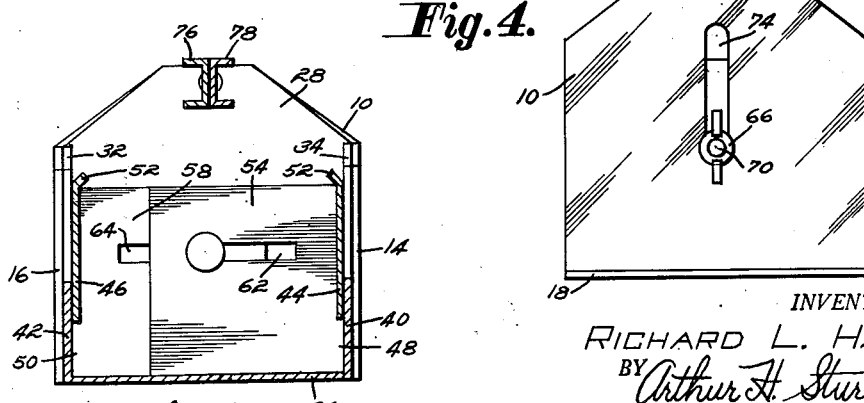
Figure 3 is a cross section through the feeder taken on line 3—3 of Figure 2.
Figure 4 is an end elevational view of the feeder.

Referring now to the drawings wherein like reference characters denote corresponding parts the adjustable poultry feeder of this invention is provided with end supports 10 and 12, which are channel-shaped in cross section, the support 10 having side flanges 14 and 16 and a base flange 18, and the support 12 having side flanges 20 and 22 and a base flange 24, and a bottom or base 26 is positioned between the end supports with plates 28 and 30 extended upwardly from the ends and nested in the end supports.

The plate 28 at one end of the base is provided with side flanges 32 and 34 and similar flanges 36 and 38 are provided on the edges of the plate 30. The bottom or base 26 is also provided with side flanges 40 and 42 which provide outside walls for troughs formed in the sides of the feeder.

The feeder is also provided with laterally adjustable members having side walls 44 and 46 which are provided with recesses 48 and 50 in the lower edges through which feed flows into troughs formed between the walls 44 and 46 and the flanges 40 and 42 on the edges of the base 26, when the side walls are adjusted inwardly to the positions shown in dotted lines in Figure 1. The upper edges of the side walls 44 and 46 are provided with inwardly extended lips 52 which prevent feed being knocked out of the large portion of the trough.

The side wall 44 is also provided with horizontally extended flanges 54 and 56 on the ends and similar flanges 58 and 60 are provided on the ends of the side wall 46. The end flanges of the side wall 44 are provided with horizontally disposed slots 62 and similar slots 64 are provided in the flanges 58 and 60 of the side wall 46.

The parts of the feeder are retained in assembled relation by wing nuts 66 and 68 on threaded studs 70 and 72 which are carried in the plates 28 and 30 which extend upwardly from the base, and which extend through the slots 62 and 64 in the flanges of the side walls 44 and 46 and also through vertically positioned slots 74 in the end supports 10 and 12.

The spinner or rocker, which may be of any suitable type or design, is shown as formed with channel-shaped members 76 and 78, and pins 80 and 82 which extend from the ends are freely positioned in openings 84 whereby should a chicken light on the spinner the spinner will rotate and throw the chicken from the feeder.

With the parts formed in this manner the side plates or walls 44 and 46 may readily be adjusted inwardly to the positions shown in dotted lines in Figure 1 to provide troughs for baby chicks at the sides, and as the chickens grow the side walls are moved outwardly and the base with the side walls and flanges 48 and 50 adjusted upwardly to the desired height, and to such a position that it is necessary for the chickens to stretch to reach the feed. By this means the position of the trough is continuously adjusted so that the chickens are required to stretch their leg muscles in order to obtain feed and consequently, the legs of the chickens are strengthened.

From the foregoing description it is thought to be obvious that a chicken feeder constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

Having thus fully described the invention what I claim as new and desire to secure by Letters Patent, is:

In a feed trough, the combination which comprises an elongated base, channel-shaped in cross section having a bottom plate with upwardly extended flanges at the sides, vertically disposed end supports, also channel-shaped in cross section, having plates positioned against the ends of the base with flanges on the edges over-lapping the flanges of the base, side walls having flanges on the ends also positioned on the base, the flanges of one of said side walls overlapping the flanges of the other side wall and said flanges of the side walls being nested against the inner surfaces of the end supports, the lower edges of said side walls being spaced above the bottom plate, said flanges of the side walls having horizontally disposed slots therein and said end supports having vertically disposed slots therein, a longitudinally disposed centrally positioned spinner journaled in the upper ends of said end supports, and bolts extended through the slots of the flanges of said side walls and slots of the end supports for adjustably retaining the parts in assembled relation, whereby the positions of the side walls are adjustable laterally to regulate the widths of sections of the feed trough formed between the side walls and flanges of the bottom plate, and are adjustable vertically to regulate the amount of feed in said sections of the feed trough.

RICHARD L. HART.

References Cited in the file of this patent

UNITED STATES PATENTS

| Number | Name | Date |
|---|---|---|
| 1,871,804 | McGrew | Aug. 16, 1932 |
| 2,361,598 | Calhoon | Oct. 31, 1944 |
| 2,514,910 | Strong | July 11, 1950 |
| 2,525,654 | De Ville | Oct. 10, 1950 |
| 2,539,299 | Duhmert | Jan. 23, 1951 |

FOREIGN PATENTS

| Number | Country | Date |
|---|---|---|
| 350,312 | Great Britain | June 11, 1931 |